M. STRANSKY.
COOKING OR HEATING UTENSIL.
APPLICATION FILED SEPT. 29, 1909.
977,052.
Patented Nov. 29, 1910.
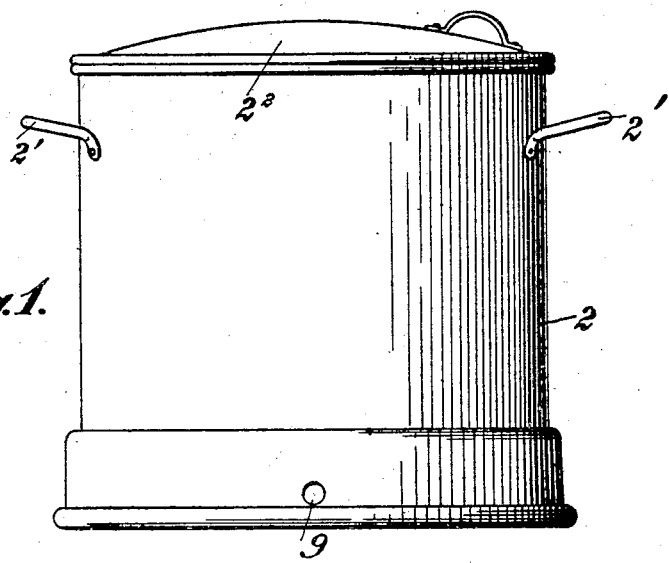
Fig. 1.
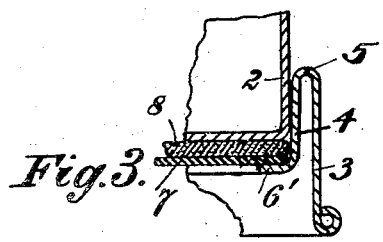
Fig. 3.
Fig. 2.
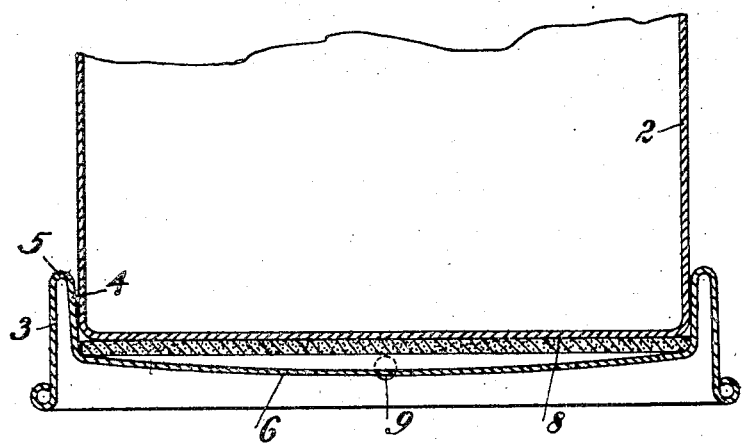
Witnesses:
Inventor;
Maurice Stransky,
By his Attorney

UNITED STATES PATENT OFFICE.

MAURICE STRANSKY, OF NEW YORK, N. Y.

COOKING OR HEATING UTENSIL.

977,052.  Specification of Letters Patent.  Patented Nov. 29, 1910.

Application filed September 29, 1909. Serial No. 520,102.

*To all whom it may concern:*

Be it known that I, MAURICE STRANSKY, of the borough of Manhattan, city and State of New York, have invented a certain new and useful Improvement in Cooking or Heating Utensils, of which the following is a specification.

This invention relates to the construction of base pieces or supporting appliances in which food containers during the application of heat thereto are designed to be set for the purpose of preventing the overheating and scorching of their contents and the impairment of the bottoms of such vessels.

The present base consists of a tubular section which comprises an outer tubular portion and an inner similar portion connecting at the upper edge of the base by an integral part, preferably rounding. From said inner portion there extends inwardly a shoulder which in conjunction with said portion provides a support for the container such that the bottom of the latter is adapted to be held somewhat above a stove top and in close proximity to a highly heated inclosed space.

In the drawing accompanying the present specification Figure 1 is an elevation of an assembled food container and a base embodying my present invention. Fig. 2 is a section upon a somewhat enlarged scale of the lower portion of the container and the base. Fig. 3 is a sectional detail illustrating a modification.

Similar characters of reference designate corresponding parts in all figures.

The container or pot for the food to be cooked or heated may be of any desired shape and material, the base used in conjunction with it being shaped and dimensioned to correspond. This container is designated generally herein by 2, and the handles and cover thereof by 2', 2² respectively. Separable from the container is the base with which the former may be readily engaged and from which it may as readily be lifted out.

The present base comprises an outer tubular portion 3 and integral therewith an imperforate similar inner portion of smaller diameter lying within the former and connecting therewith, preferably, by a rounding or convex part 5 to avoid the presence of a sharp hand-injuring edge and to facilitate the entrance of the container. In this latter connection, portion 4 may be somewhat larger in diameter adjacent to part 5 than at the opposite end. At this said opposite end tubular portion 4 is provided with a shoulder which projects under the container and limits the inward or seating movement of the latter. This shoulder may obviously be of different forms. For instance, as indicated in Fig. 2, the shoulder is formed by a laterally projecting bottom plate 6; in Fig. 3 the shoulder is formed by a laterally extending flange 6'. There is also indicated in this latter figure, a plate 7 which rests upon this flange while a pad 8 of asbestos or like refractory material may be placed in direct contact with the container bottom for the usual purpose. Ventilating holes 9 may be provided as shown.

As thus constructed and when in use, the container bottom and parts adjacent thereto (by reason of the annular space existing between portions 3 and 4) are subjected to the heat of a highly heated inclosed air space. The material used for the base may obviously be of anything appropriate to the purpose, but when struck up from sheet metal the described form of the base is such as to lend itself to economy of manufacture since the base portions and parts, including the aforesaid shoulder are all formed from one integral piece. The upper edge of the base also, being convex is not liable to injure the hand of the user while it facilitates the placing of the container as already referred to.

Having described my invention, I claim:

A one-piece sheet metal base for a food container comprising an outer tubular portion, an inner tubular portion adapted to receive the container, and a bottom plate for supporting and precluding the application of too high a degree of heat to the bottom of the container, said inner tubular portion being of less diameter than and integrally connected to said outer tubular portion by a rounding part whereby an annular heating space is formed and said bottom plate being integral with and extending laterally from said inner tubular portion over the entire cross sectional area thereof.

In witness whereof I have signed this specification in the presence of two subscribing witnesses.

MAURICE STRANSKY.

Witnesses:
 WM. H. WEIL,
 OSCAR LEHMANN.